United States Patent [19]
Casciola

[11] 3,847,252

[45] Nov. 12, 1974

[54] IMPACT-ABSORBING ASSEMBLIES

[76] Inventor: Massimo Casciola, Via Monte delle Gioie, 34, Rome, Italy

[22] Filed: Apr. 24, 1973

[21] Appl. No.: 354,016

Related U.S. Application Data

[63] Continuation-in-part of Ser. No. 229,269, Feb. 25, 1972.

[52] U.S. Cl. .................................. 188/1 C, 293/70
[51] Int. Cl. ............................................. F16f 7/12
[58] Field of Search ......... 74/492; 188/1 C; 293/70, 293/71 R

[56] References Cited
UNITED STATES PATENTS

| | | | |
|---|---|---|---|
| 2,971,566 | 2/1961 | Negroni | 188/1 C X |
| 3,200,584 | 8/1965 | Mitchell | 188/1 C X |
| 3,432,200 | 3/1969 | Barton | 188/1 C UX |
| 3,582,133 | 6/1971 | De Lavenne | 188/1 C X |
| 3,628,634 | 12/1971 | Valukonis | 188/1 C |
| 3,757,900 | 9/1973 | Gischlar | 188/1 C |

*Primary Examiner*—Duane A. Reger
*Attorney, Agent, or Firm*—Steinberg & Blake

[57] ABSTRACT

An energy-absorbing assembly particularly of the type adapted to absorb the impact of a moving body. The assembly includes a deformable body and a deforming element having a portion which occupies a space previously occupied by part of the deformable body during the impact or energy-absorbing operation. The deformable body is radially deformed into a free space so that the material of the deformable body need not be longitudinally displaced from one side to the other side of the deforming portion of the deforming element.

18 Claims, 17 Drawing Figures

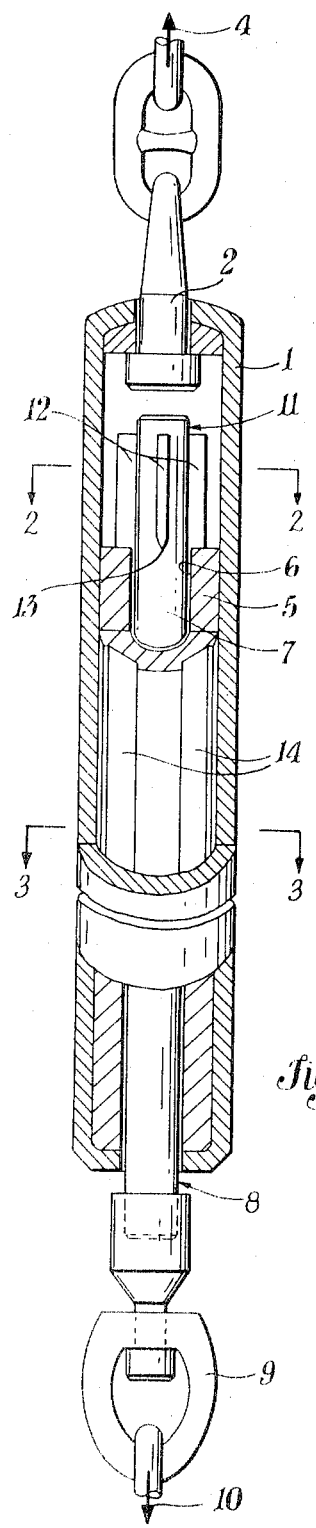
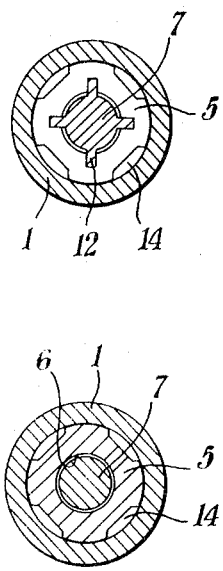
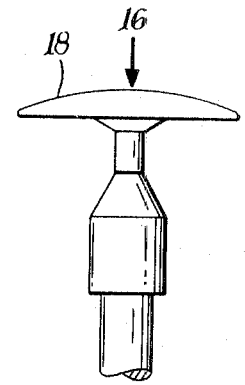
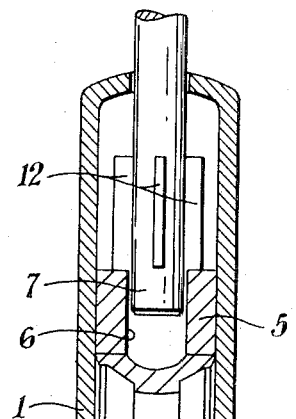
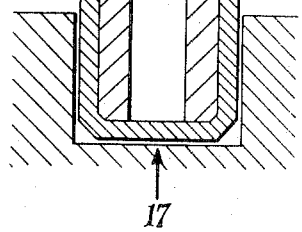
Fig. 1
Fig. 2
Fig. 3
Fig. 7

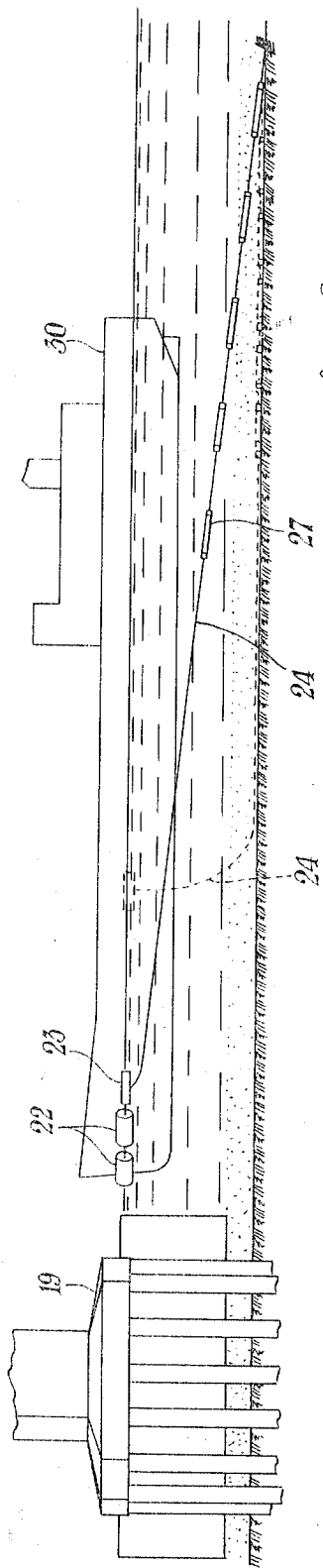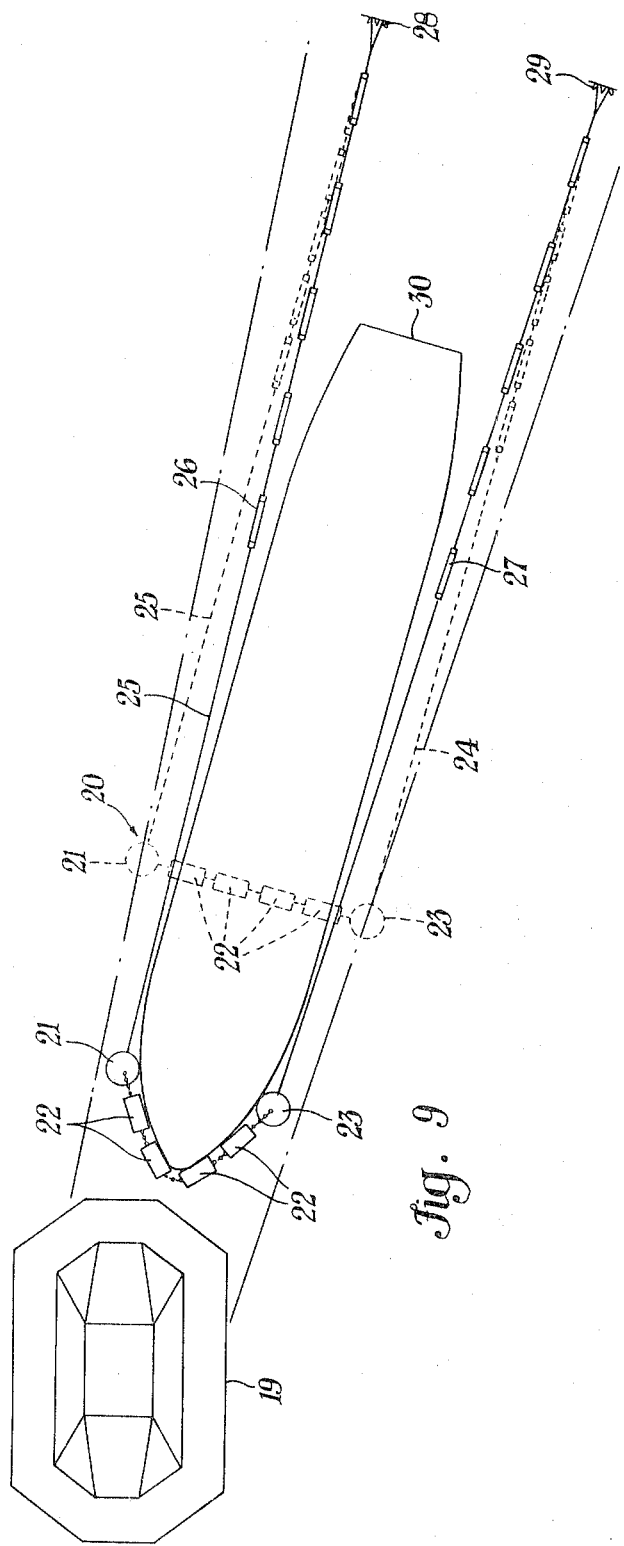

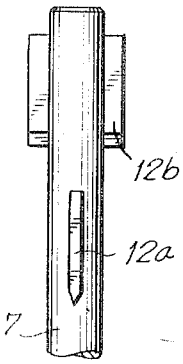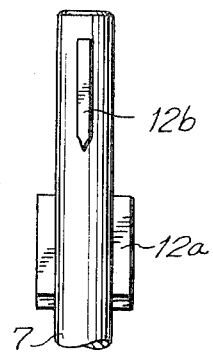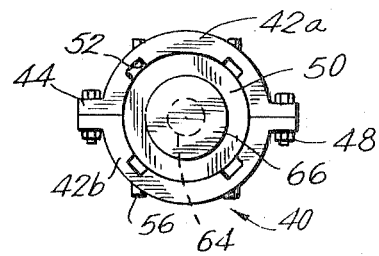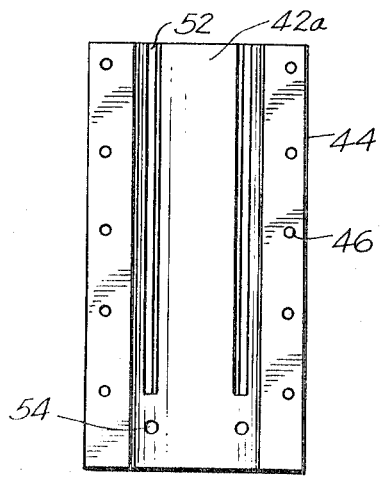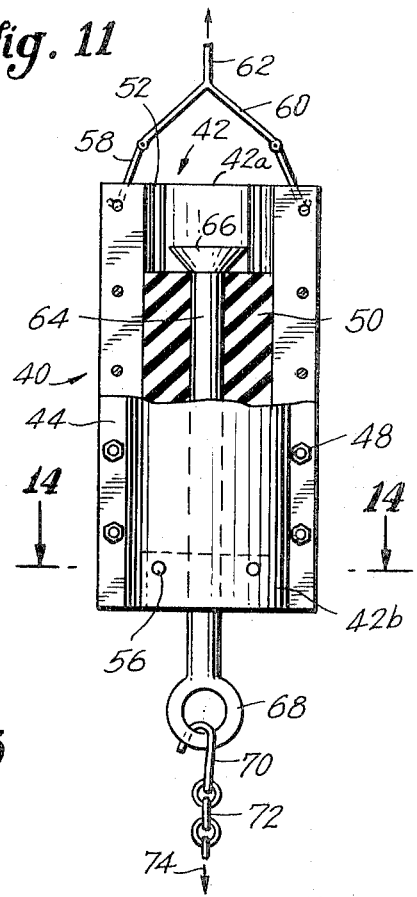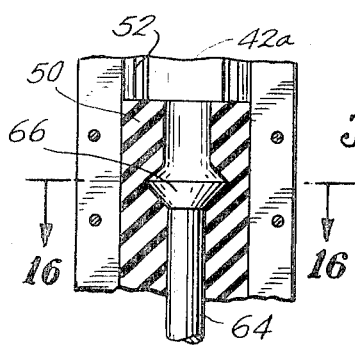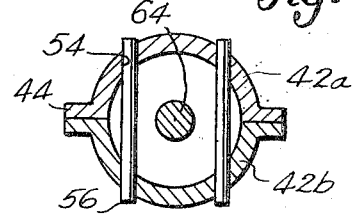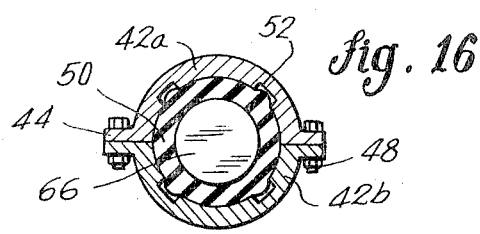

IMPACT-ABSORBING ASSEMBLIES

CROSS REFERENCE TO RELATED APPLICATION

This application is a continuation-in-part of copending application Ser. No. 229,269, filed Feb. 25, 1972, and entitled Emergency Shock-Absorber For Dissipation of Kinetic Energy of Moving Masses.

BACKGROUND OF THE INVENTION

The present invention relates to energy-absorbing assemblies of the type which are particularly adapted to absorb the impact of a moving body such as a moving vehicle.

Although a number of devices of this general type are known, the conventional structures suffer from several drawbacks. Thus, in the case where the conventional devices include deformable masses, such as bodies of solid material, considerable difficulty is encountered because attempts are made to have such masses behave in a manner similar to a liquid. For example it is well known that in hydraulic shock absorbers, which are designed to absorb smaller forces than those capable of being absorbed by the device of the present invention, the hydraulic liquid is axially displaced from one side to the other side of a piston during displacement of the latter in a cylinder, for example. It is common in many known devices where solid bodies are to be deformed to situate these bodies in confined spaces which do not permit the bodies to absorb the energy unless the body flows much in the same way as a liquid from one side to the other side of a deforming element which acts much in the same way as a piston. Actual experience has shown that it is virtually impossible to have a solid mass behave in this way, and it is this basic principle of the known constructions which forms a source of the major difficulties encountered with conventional devices.

Moreover, devices of this general type are required to remain for long periods of time exposed to severe exterior influences such as the influences of different weather conditions, moisture, and the like, with the result that the known constructions deteriorate before they are called upon to perform in an emergency situation, so that when an emergency does occur requiring absorbtion of a large amount of energy the known constructions cannot perform properly.

Yet another problem encountered with conventional devices of the above general type is that they cannot be used repeatedly. After once absorbing a powerful impact force, for example, the known constructions are virtually destroyed so that it is essential to replace the used structure with an entirely new structure.

SUMMARY OF THE INVENTION

It is accordingly a primary object of the present invention to provide an energy-absorbing assembly which will avoid the above drawbacks.

In particular, it is an object of the present invention to provide an energy-absorbing assembly which dissipates energy, such as kinetic energy, by utilizing this energy to deform a solid mass, without, however, requiring such a mass to behave in a manner similar to a liquid according to which the mass must be longitudinally displaced from one side to the other side of a deforming element which behaves in the manner of a piston.

Yet another object of the present invention is to provide a construction of the above general type which is composed of simple rugged elements which are relatively inexpensive to manufacture and assemble.

Also, it is an object of the present invention to provide a construction of the above general type which permits a body which has been deformed to be replaced in the assembly only by another body which has not yet been deformed, the remainder of the structure being utilized repeatedly.

Also, it is an object of the present invention to provide a device of the above general type which is capable of withstanding severe external conditions, even conditions under which the device is immersed in sea water, without causing any undesirable deterioration of the structure so that it is always available for operation when required.

According to the invention the energy-absorbing assembly includes an elongated deformable means and an elongated deforming means which extends longitudinally along the deformable means. The deformable and deforming means respectively form a pair of means at least one of which is longitudinally displaced with respect to the other in a given direction during absorbing of the energy of a shock, impact, or the like. The deforming means has a deforming portion which occupies a space previously occupied by part of the deformable means upon displacement of at least one of the pair of means in the above given direction, so that the deformable means is deformed by the deforming portion of the deforming means during this displacement. A displacing means is operatively connected with at least one of the above pair of means for displacing at least this one of the pair of means with respect to the other in the above given direction during an energy-absorbing operation. The deformable means has an exposed surface area extending longitudinally of the deformable means at a part thereof which becomes transversely aligned with the deforming portion of the deforming means when the deforming portion deforms the deformable means while occupying a space previously occupied by part of the deformable means. This exposed surface area of the deformable means defines at least part of a free space into which the deformable means is transversely extended during deformation of the deformable means by the deforming means.

BRIEF DESCRIPTION OF DRAWINGS

The invention is illustrated by way of example in the accompanying drawings which form part of this application and in which:

FIG. 1 is a partly sectional longitudinal elevation of one embodiment of a device according to the invention;

FIG. 2 is a transverse section of the device of FIG. 1 taken along line 2—2 of FIG. 1 in the direction of the arrow;

FIG. 3 is a transverse section of the device of FIG. 1 taken along line 3—3 of FIG. 1 in the direction of the arrow;

FIG. 7 is a partly sectional longitudinal elevation of another embodiment of a device according to the invention;

FIG. 8 is a schematic representation illustrating how the device of the invention may be used in connection with a ship;

FIG. 9 is a schematic top plan view of the arrangement of FIG. 8;

FIG. 10A is a fragmentary elevation of another embodiment of a deforming means;

FIG. 10B shows the deforming means of FIG. 10A as seen from the right of FIG. 10A;

FIG. 11 is a partly sectional elevation of a further embodiment of a device according to the invention;

FIG. 12 is an elevation of part of a casing of FIG. 11 as seen when looking toward the interior of this part of the casing;

FIG. 13 is a top plan view of the device of FIG. 11;

FIG. 14 is a transverse section of the device of FIG. 11 taken along line 14—14 of FIG. 11 in the direction of the arrow;

FIG. 15 is a fragmentary sectional elevation showing the structure of FIG. 11 after deformation has taken place with absorbtion of energy; and FIG. 16 is a transverse section of the device of FIG. 15 taken along line 16—16 of FIG. 15 in the direction of the arrows to illustrate the manner in which the structure behaves during absorbing of energy.

DESCRIPTION OF PREFERRED EMBODIMENTS

Figure 5:
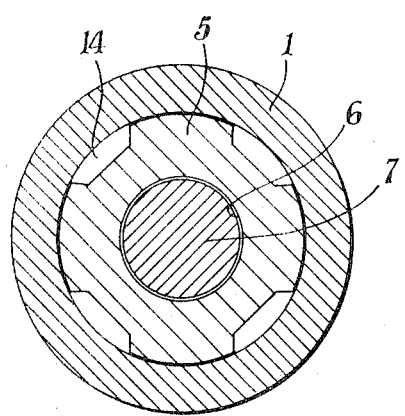
FIG. 5 is a transverse section of the device of the invention showing the deformable means before it has been deformed.

Referring first to FIG. 1, there is illustrated therein the outer casing 1 of cylindrical configuration forming a housing for a deformable means 5 in the form of an elongated cylindrical body described in greater detail below. This deformable means which is formed by the body 5 is designed to be deformed, during an energy-absorbing operation, by a deforming means which is constituted by the elongated bar 7 and the fins 12 fixed thereto, the fins 12 being a deforming portion of the deforming means 7, 12 and designed to occupy a space which is initially occupied by part of the deformable means 5, as described below.

The deforming means 7, 12, and the deformable means 5 are coaxially arranged with the bar 7 extending through an axial bore 6 which is formed in the cylindrical body 5, and a displacing means is operatively connected to the device for displacing the deforming means 7, 12 and the deformable means 5 one with respect to the other along their common axis in a direction which pushes the fins 12 into the body 5. In order to facilitate this operation it will be noted that the fins 12 are shown in FIG. 1 as having at their lower ends tapered edges 13. The displacing means in the illustrated example is constituted in part by the element 2 which is connected with the casing 1 so as to act through the latter on the body 5 to tend to displace the latter upwardly, as indicated by the arrow 4 in FIG. 1. This part 2 of the displacing means may take the form of an elongated chain, for example, connected to the pin which extends into the top end of the casing in the manner shown in FIG. 1 and anchored to any suitable structure.

The displacing means also includes the chain 9 fixed with the end 8 of the bar 7 to pull the latter downwardly, as viewed in FIG. 1, in the direction of the arrow 10. Thus, in response to an impact which pulls the displacing parts 2 and 9 apart from each other in the direction of the arrows 4 and 10, the deformable means 5 and the deforming means 7, 12 will be displaced one with respect to the other in the direction which locates the fins 12 between the opposed ends of the body 5 whereas initially these fins 12 are located adjacent an end of the body 5 overlapping the latter as illustrated.

In the illustrated example the body 5 is made of a plastically flowable material of substantially no elasticity, such as lead or alloys thereof, and the cross section of the bar 7 is small enough to enable the bar 7 to be freely received in the bore 6. Thus, the part 9 of the displacing means is fixed to the end 8 of the bar 7 while the fins 12 are fixed to the opposed end 11 of the bar 7. While the tapered substantially knife-like edges 13 are not essential at the ends of the fins 12 next to the body 5, these tapered portions 13 will facilitate formation of initial notches which guide the fins 12 into the body 5.

With the embodiment of the invention which is illustrated in FIG. 1, the casing 1 is of a simple cylindrical configuration while the body 5 is formed at its exterior with longitudinally extending grooves 14 which are spaced from the inner surface of the casing 1 so as to define therewith elongated spaces. Thus, the surfaces of the grooves 14 of the body 5 form exposed areas of the body 5 defining parts of spaces into which the body 5 can be transversely extended by the deforming portions 12 as described in greater detail below.

As is apparent from FIG. 2, the fins 12 are arranged so that they are angularly aligned with the thicker parts of the body 5 situated between the grooves 14 thereof, while FIG. 3 shows the arrangement of the grooves 14 around the bar 7 within the casing 1 below the fins 12. The volume of the grooves 14 is such that the spaces defined thereby with the inner surface of the casing 1 have a volume which is sufficiently great to receive at least all of the material of the body 5 which is radially displaced outwardly by the fins 12.

Figure 6:
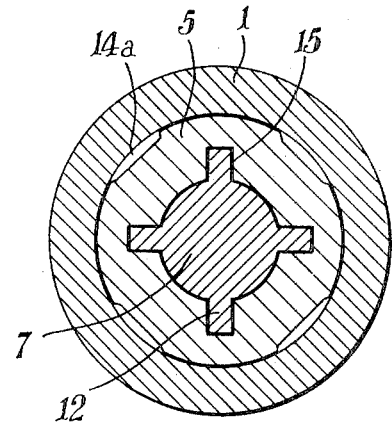
FIG. 6 is a transverse section of the device showing the deformable means after it has been deformed.

FIG. 5 shows the structure of FIG. 3 at a larger scale in order to illustrate clearly the magnitude of the spaces 14 prior to deformation of the body 5. FIG. 6 is a section taken in the same plane as FIG. 5 but showing the configuration of the body 5 after it has been deformed by the fins 12. It will be noted that these fins 12 form grooves 15 in the body 5 so that the fins 12 occupy space initially occupied by the material of the body 5, and the material which is radially extended outwardly by the deforming portions 12 of the deforming means 7, 12 brings about a deformation of the body 5 in such a way that the volume of the grooves 14 is reduced, these grooves 14 then assuming the configuration indicated by the grooves 14a in FIG. 6. The cross sectional area by which the grooves 14 are diminished from the condition of FIG. 5 to the condition of FIG. 6 is equal to the cross sectional area of the fins 12. Because of the use of a material such as lead or alloys thereof, the material of the body 5 will flow plastically to change from the configuration of FIG. 5 to that of FIG. 6 and will remain at the configuration shown in FIG. 6.

Figure 4:
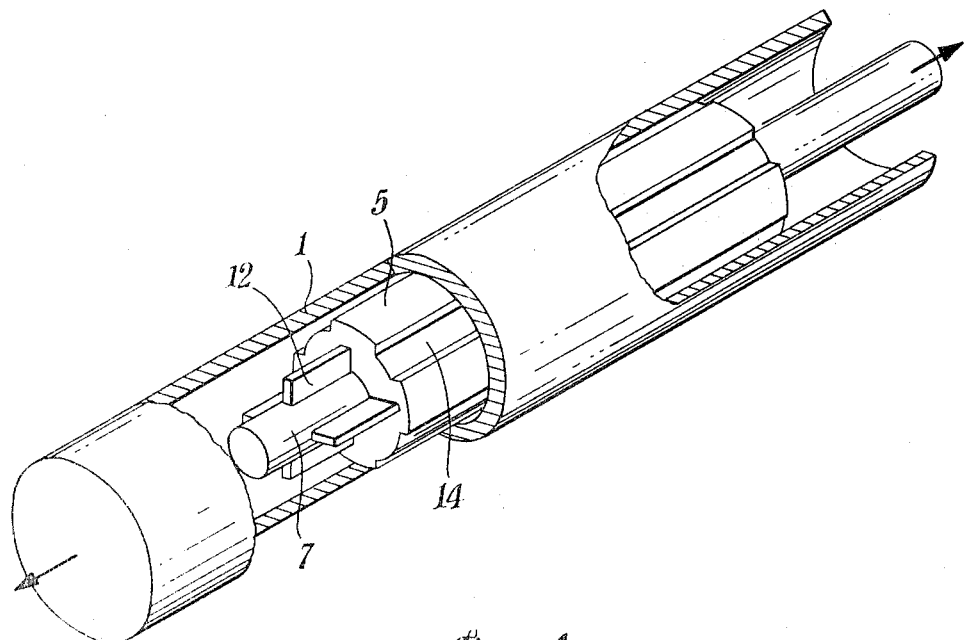
FIG. 4 is a partly sectional perspective illustration of the structure of FIGS. 1–3 illustrating the manner in which this structure operates.

FIG. 4 shows in a perspective partly sectional illustration the manner in which the structure of the invention operates. The casing 1 together with the body 5 are urged downwardly toward the left, as shown by the arrow at the lower left of FIG. 4, while the bar 7 is urged upwardly toward the right, as shown by the arrow at the upper end of FIG. 4, with the result that the fins 12 will be displaced into the body 5 to deform the latter. It is to be noted in this cinnection that the body 5 will remain reliably in the position within the casing 1 shown in FIG. 4 because of the pressure between the exterior surface of the body 5, between the grooves 14 thereof, and the inner surface of the casing 1. In other words, the lower end of the casing 1, as viewed in FIG. 1, is not required to withstand any substantial force. The body 5 is initially situated in the casing 1 with a tight fit, and as soon as the fins 12 start to move into the body 5 the exterior surface of the latter engages the inner surface of the casing 1 with a substantial force preventing any displacement between the body 5 and the casing 1, without creating, therefore, any particular force which tends to slide the body 5 out of the casing 1. In this way the force exerted on the casing 1 by way of the part 2 of the displacing means is reliably transmitted to the body 5 which has absolutely no tendency to move with respect to the body 1 in view of the above factors.

Of course, once an impact-absorbing operation has been performed, the body 5 will have the condition shown in FIG. 6 and will have to be replaced. For this purpose the casing 1 is composed of a number of parts which are releasably fixed to each other so that the casing 1 can be readily opened in order to expose the body 5 which then can be removed from the deforming means 7, 12 and replaced by a new body 5, so that the parts can then be reassembled. One possible construction for this purpose is described in greater detail below.

While the above embodiment of the invention has been described in connection with impact forces which will pull in the direction of the arrows 4 and 10 of FIG. 1, the invention is equally applicable to pushing forces. Thus, FIG. 7 shows an embodiment of the invention where the deforming means 7, 12 extends upwardly beyond the body 5 through the top end of the casing 1 which in this case is supported by any robust stationary support means as shown at the lower end of FIG. 7 so that the casing 1 together with the body 5 cannot move downwardly. The displacing means of this embodiment takes the form of an impact element 18 fixed to the top end of the bar 7, as viewed in FIG. 7. Thus, in response to an impact force 16 acting on the impact element 8, with a resulting reaction force 17 at the lower support means of FIG. 7, the deforming portions 12 will be driven down into the body 5 producing the same results as described above in connection with FIGS. 5 and 6. It is to be noted that in this case the fins 12 are not provided with the tapered knife-like edges 13. These edges are not essential and the device of FIG. 7 will operate just as well with fins 12 as illustrated in FIG. 7.

While the device is illustrated in FIG. 7 as being arranged vertically so that it can absorb the force of a falling body such as an elevator which accidentally falls, for example, it is also possible to arrange the structure of FIG. 7 horizontally so that the impact element 8 can receive the force of a train which does not stop within the required distance, for example.

As has been indicated above, it is preferred to use for the body 5 a material such as lead or alloys thereof, and the other components will be made of materials such as stainless steel, for example, so that the structure will not be subject to corrosion. In fact this structure can remain for long periods of time in sea water without deteriorating so as to remain at all times ready to absorb forces under an emergency situation.

Thus, FIGS. 8 and 9 show schematically how the structure of the invention can be used to stop the movement of a vessel such as a ship under emergency conditions. As may be seen from FIGS. 8 and 9, a barrier 20 is provided to protect a pier 19 which may form part of a bridge, for example. This barrier 20 includes a plurality of floats 21–23 which are connected with cables or navy chains 24 and 25. These chains or cables are in turn connected at their ends distant from the floats 21 and 23 to a series of devices 26 and 27 which have the structure shown in FIG. 1 and described above. The series of devices 26 and 27 which are connected one to the next are anchored to the sea bottom at 28 and 29 in any suitable way. In their rest position prior to stopping of a ship the components of the barrier 20 will have, for example, the dotted line condition shown in FIG. 9. However, when a ship 30 approaches the pier 19 it will engage the floats 21–23 raising the chain 24 from the position shown in dotted lines in FIG. 8 to the solid line position, with the chain 25 being raised in the same way, and providing the pulling force on the several devices 26 and 27 of the invention to reliably bring the vessel 30 to a stop before any possible damage can occur either to the vessel 30 or to the pier 19.

Because of the materials used for the device of the invention, this device can remain for long periods of time in an environment as illustrated in FIGS. 8 and 9 without any deterioration. It is furthermore to be noted that the manufacture of the components of the device of the invention requires no particular precision and these components are thus inexpensive to manufacture and assemble. There are no expensive delicate parts in the assembly of the invention.

In particular it is to be noted that a material such as lead or alloys thereof when used for the body 5 is for all practical purposes inert with respect to influences such as possible corrosion from sea water, and in addition temperature fluctuations have no influence on the structure of the invention so that it is perfectly reliable for applications such as that illustrated in FIGS. 8 and 9.

Of course, variations are possible with respect to the particular details of the structure described above. For example, as shown in FIGS. 10A and 10B, the fins 12 can be arranged on the bar 7 in such a way that one pair of fins, namely the fins 12a shown in FIGS. 10A and 10B, will initially engage the body 5 prior to arrival of a second pair of fins 12b at the body 5. These fins of FIGS. 10A and 10B are circumferentially arranged in the manner shown in FIG. 2, but the pair of fins 12a are located in a common plane which is perpendicular to the common plane occupied by the pair of fins 12b. In this way the body 5 will initially be penetrated only by the pair of fins 12a and thereafter by the pair of fins 12b.

FIG. 11 illustrates an embodiment of the invention designed for use under conditions where the magnitude of the forces to be absorbed are less than those which can be absorbed by the device of FIGS. 1 or 7. Thus, the device 40 of the invention which is illustrated in FIG. 11 includes a casing 42 composed of a pair of shells 42a and 42b. The structure of the shell 42a when looking toward its inner surface as shown in FIG. 12, and the shell 42b is constructed in the same way. Thus, these shells which form the casing 42 are in the form of half-cylinders each provided with a pair of longitudinal side flanges 44. These flanges are formed with openings 46 which are aligned with each other so as to receive the fastening bolts 48, and in this way the casing 42 may be readily assembled and disassembled. A similar construction may be used for the casing 1.

With the embodiment of FIG. 11 the deformable means 50 takes the form of an elongated cylindrical body made of an elastomeric material such as natural or synthetic rubber, for example. Any elastomeric plastic may be used, however. With this embodiment it is the inner surface of the casing 14 which is formed with elongated grooves 52. The grooves 52 are circumferentially arranged as shown in FIG. 13 and may extend longitudinally along each of the shells as shown for the shell 42a in FIG. 12. These shells may be formed just below the grooves 52 with openings 54 capable of receiving pins 56 (FIG. 14) for the purpose of temporarily retaining the deformable means 50 within the casing 42.

Instead of receiving bolts, the upper openings 46 of the flanges 44 may receive a pair of hooks 58 connected to a chain assembly 60, for example, in order to exert the pulling force 62 schematically indicated by the arrow at the top of FIG. 11.

The deformable means 50 is formed with an axial bore which receives an elongated bar 64 fixed at its top end with a deforming portion 66 in the form of a tapered enlargement which overlaps the top end of the body 50 as viewed in FIG. 11. At its lower end which extends beyond the body 50 and between the pins 56 the bar 64 may have an eye 68 for receiving a hook 70 at one end of a chain 72 which forms together with the chain 60 the displacing means and which is adapted to apply a force as indicated by the arrow 74 when performing an energy or impact-absorbing operation.

It will be noted that with the above construction of FIG. 11 the exterior surface of the body 50 forms a simple cylinder having elongated exposed surface areas aligned with the grooves 52 so as to define with the latter free spaces into which the body 50 may be radially extended outwardly in response to deformation provided by movement of the deforming portion 66 into the body 50. Thus, when receiving an impact, the bar 64 may be displaced with respect to the body 50 to a position such as that shown in FIG. 15, and as will be noted from FIG. 16 corresponding portions of the body 50 are displaced into the grooves 52 in order to reduce the volume thereof in accordance with the volume of material displaced during deformation of the body 50 by the portion 66 of the deforming means.

Because of the elastic nature of the body 50, some of the material thereof will tend to contract back over the deforming portion 66 in the manner shown in FIG. 15, but this is only due to the inherent nature of the material 50 and such a contraction is not essential.

Of course, it is also possible to provide for the construction of FIG. 1 an arrangement according to which the grooves are formed in the casing rather than in the body 5.

With the embodiment of FIG. 11, as with the embodiment of FIG. 1, it is possible to take the casing apart and replace one deformable body by another, with the remaining parts being used repeatedly. Thus, instead of a body 50 of an elastomeric material it is also possible to use for the body 50 a plastically flowable material such as lead or alloys thereof, particularly for cases where larger forces are to be absorbed.

It is to be noted that the embodiments of FIGS. 1 and 7 are preferred because they are more rugged and lend themselves to more severe usuage under a wide variety of conditions. Nevertheless, the embodiment of FIG. 11 also operates according to the principle of the present invention and can be used in accordance with the invention where smaller impacts or shocks are to be absorbed.

What is claimed is:

1. In an energy-absorbing assembly, elongated deformable means and elongated deforming means coaxial with and located next to said deformable means for deforming the latter when at least one of said means is displaced with respect to the other in a given direction, along their common axis during absorbing of the energy of a shock, impact, or the like, said deforming means having a deforming portion which occupies a space previously occupied by part of said deformable means upon displacement of said one means in said given direction, displacing means operatively connected with at least said one means for displacing at least one means with respect to the other in said given direction during an energy-absorbing operation, said deformable means having an exposed surface area extending longitudinally of said deformable means and defining at least part of a free space into which said deformable means is transversely extending during deformation of said deformable means by said deforming means, and casing means housing said elongated deformable means and having an exposed surface area directed toward said exposed surface area of said deformable means for defining said free space therewith, said casing means and deformable means directly engaging each other over an area sufficiently great to prevent movement of said casing means and deformable means one with respect to the other, during deformation of said deformable means by said deforming means, as a result of the frictional engagement between said casing means and deformable means.

2. The combination of claim 1 and wherein said space has a volume which is at least great enough to receive all of the material of said deformable means which is transversely extended by said deforming portion of said deforming means.

3. The combination of claim 2 and wherein said deformable means is constituted by an elongated solid body of substantially cylindrical configuration formed with an axial bore.

4. The combination of claim 3 and wherein said deforming means includes a bar of small enough cross section to be received in said bore, said bar carrying a radially projecting portion forming said deforming portion of said deforming means and situated initially adjacent and overlapping one end of said body, said displacing means situating said deforming portion between the ends of said body during displacement of said one means in said given direction, and said exposed surface area extending longitudinally along the outer surface of said body so that the latter is radially extended outwardly by said deforming portion during said displacement.

5. In an energy-absorbing assembly, elongated deformable means and elongated deforming means coaxial with and located next to said deformable means for deforming the latter when at least one of said means is displaced with respect to the other in a given direction along their common axis during absorbing of the energy of a shock, impact, or the like, said deforming means having a deforming portion which occupies a space previously occupied by part of said deformable means upon displacement of said one means in said given direction, displacing means operatively connected with at least said one means for displacing at least one with with respect to the other in said given direction during an energy-absorbing operation, and said deformable means having an exposed surface area extending longitudinally of said deformable means and defining at least part of a free space into which said deformable means is transversely extended during deformation of said deformable means be said deforming means, said space which is defined at least in part by said exposed area of said deformable means having a volume which is at least great enough to receive all of the material of said deformable means which is transversely extended by said deforming portion of said deforming means, said deformable means being constituted by an elongated solid body of substantially cylindrical configuration and formed with an axial bore so that said body has an inner and outer surface area part of which forms said exposed surface area of said deformable means, said deforming means including a bar of small enough cross section to be received in said bore, said bar carrying a radially projecting portion forming said deforming portion of said deforming means and situated initially adjacent and overlapping one end of said body, said displacing means situating said deforming portion between the ends of said body during displacement of said one means in said given direction, and said exposed surface area extending longitudinally along the outer surface of said body so that the latter is radially extended outwardly by said deforming portion during said displacement, a casing housing said body which forms said deformable means and having an inner surface partially engaging said outer surface of said body while being spaced from said exposed surface area to define with the latter said space into which said body is radially extended by said deforming portion, said outer surface of said body and said inner surface of said casing having axially extending circumferentially aligned portions forming pairs of surfaces confronting each other, and at least one of each pair of surfaces being formed with a groove to define said space into which said body is radially extended.

6. The combination of claim 5 and wherein said grooves are formed in said body.

7. The combination of claim 6 and wherein said body is made of a plastically flowable substantially nonelastic material.

8. The combination of claim 7 and wherein said material is selected from the group consisting of lead or alloys thereof.

9. The combination of claim 6 and wherein said deforming portion includes a plurality of fins extending longitudinally of said bar and projecting radially therefrom.

10. The combination of claim 9 and wherein said fins are angularly positioned substantially midway between said grooves of said body.

11. The combination of claim 9 and wherein said displacing means is operatively connected at least with said bar for displacing the latter in a direction which moves said fins from said one end toward the opposite end of said body.

12. The combination of claim 11 and wherein said displacing means also is operatively connected with said casing for acting through the latter on said body to tend to displace the latter in a direction opposite to the direction of displacement of said bar.

13. The combination of claim 11 and wherein said bar projects from said body and beyond said casing prior to displacement of said fins into said body, said displacing means being in the form of an impact receiving member carried by said bar distant from said body for receiving an impact which pushes said bar into said bore to displace said fins into said body, and support means supporting said casing and body therein against displacement while said bar is pushed into said bore thereof.

14. The combination of claim 11 and wherein said bar extends through and beyond said bore of said body and said displacing means being in the form of a pulling member operatively connected to said bar for pulling the latter to move said fins from said one end toward said opposite end of said body.

15. The combination of claim 5 and wherein said grooves are formed in said casing.

16. The combination of claim 5 and wherein said casing is composed of a number of parts releasably fixed to each other so that said parts can be separated to enable one body to be replaced by another body.

17. The combination of claim 5 and wherein said body is made of an elastomeric material.

18. The combination of claim 17 and wherein said radially projecting portion is in the form of a tapered member of circular cross section having a maximum diameter greater than that of said bar.

* * * * *